United States Patent [19]

Wright

[11] 4,106,973
[45] Aug. 15, 1978

[54] YARN WELDING DEVICE

[75] Inventor: Robert C. Wright, Huntingdon Valley, Pa.

[73] Assignee: Narricot Industries, Inc., Philadelphia, Pa.

[21] Appl. No.: 759,616

[22] Filed: Jan. 17, 1977

[51] Int. Cl.² .................... B65H 69/08; B29C 27/06
[52] U.S. Cl. .................................. 156/433; 219/230; 219/243; 156/494; 156/500; 156/515; 156/579; 228/125; 228/904; 264/248; 264/322; 425/505; 425/521
[58] Field of Search ............... 156/494, 499, 500, 502, 156/198, 161, 306, 433, 579, 441, 515; 425/505, 520, 521; 228/125, 904; 219/243, 230; 264/248, 249, 322

[56] References Cited

U.S. PATENT DOCUMENTS

| 3,184,363 | 5/1965 | Strother ............................ 156/433 |
| 3,323,971 | 6/1967 | Williams ........................ 156/502 X |
| 3,492,181 | 1/1970 | Riseley ........................... 156/502 X |
| 3,827,929 | 8/1974 | Bledsoe et al. ..................... 156/502 |

Primary Examiner—William A. Powell
Assistant Examiner—Thomas Bokan
Attorney, Agent, or Firm—Caesar, Rivise, Bernstein & Cohen, Ltd.

[57] ABSTRACT

A device to weld or splice two ends of a thermoplastic yarn. The device includes means for holding the yarn adjacent a heating element. The heating element is energized and the two ends of the yarn are fused together to form a globule of molten plastic. Thereafter, the heat is terminated and the device automatically pulls the two lengths of yarn apart and holds them under tension, and at the same time, the device molds the globule into a relatively smooth mass that has a width substantially equal to the width or diameter of the yarn.

10 Claims, 13 Drawing Figures

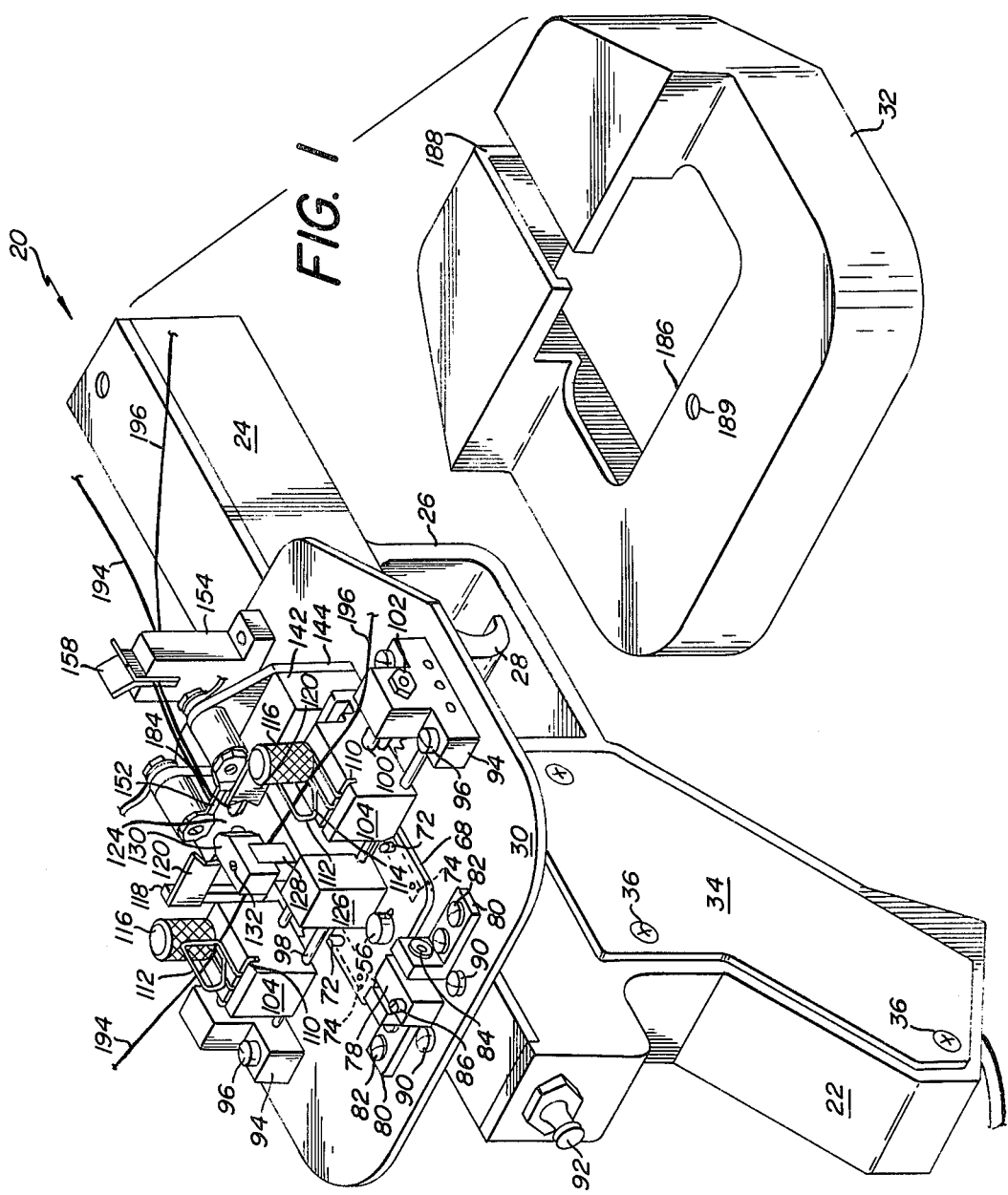
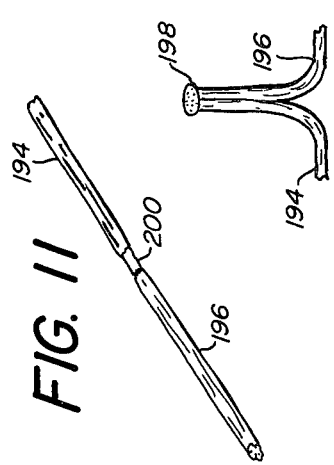
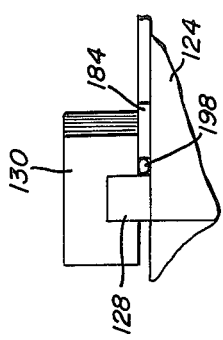

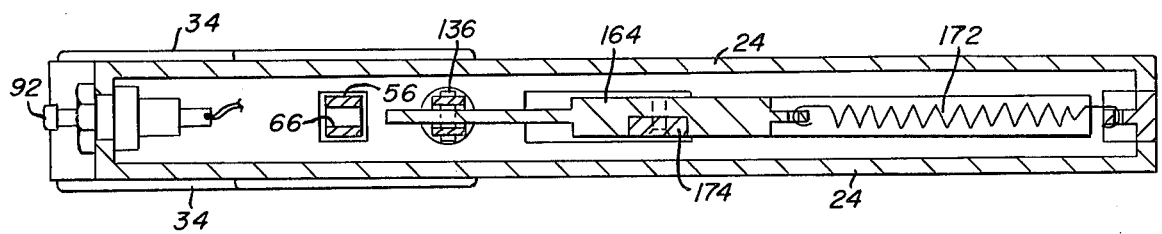
FIG. 6
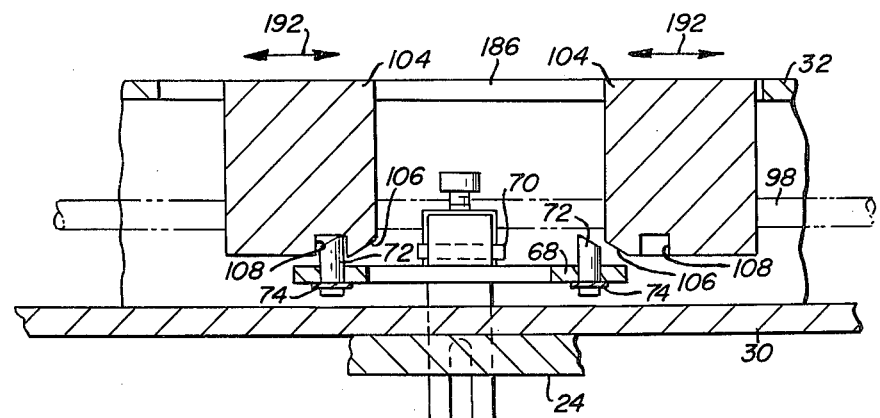
FIG. 7
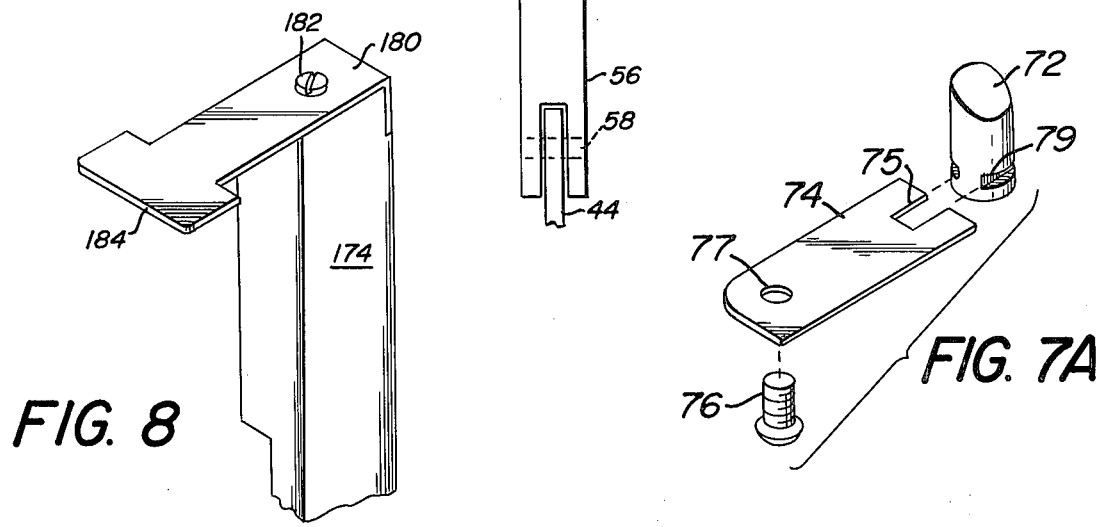
FIG. 8
FIG. 7A

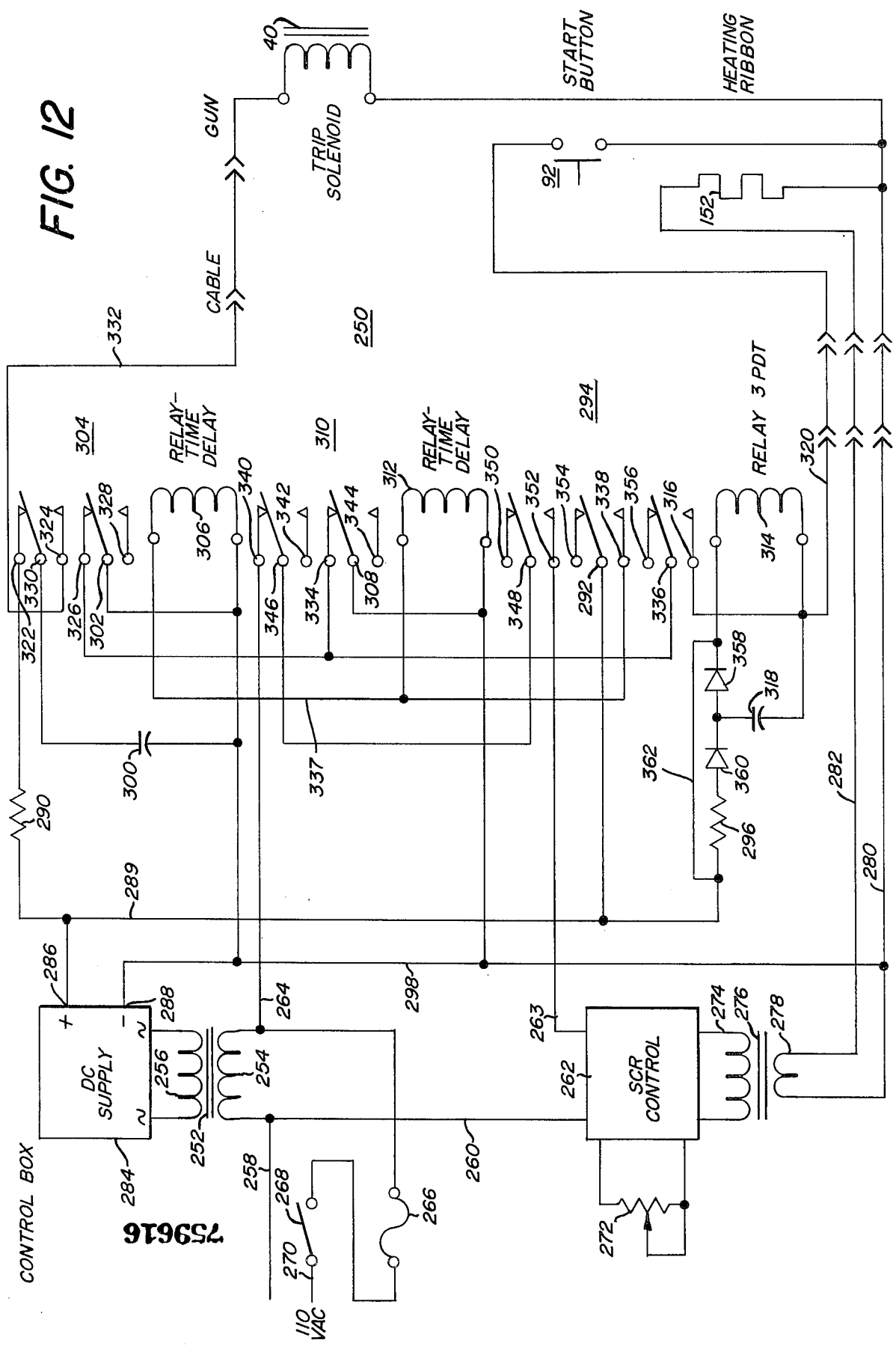

YARN WELDING DEVICE

This invention relates to a yarn welding device, and more particularly, to a device that splices the free ends of two lengths of thermoplastic yarn in order to unite them.

In textile operations utilizing continuous yarns, yarn lengths are commonly spliced to one another by knotting, cementing or welding. Additionally, whenever a yarn should break in a textile operation, such as knitting or weaving, the two ends of the yarn must be spliced, utilizing any of the techniques set forth above. When the yarn is a thermoplastic yarn, the most commonly used method of joining two lengths is through heat welding. A commonly used commercial heat welder is that shown in U.S. Pat. No. 3,323,971.

Although the device shown in U.S. Pat. No. 3,323,971 has been found to be extremely effective in welding two pieces of thermoplastic yarn, one of the problems involved with the device, and similar devices, is that the weld is highly irregular in shape and has a rough outer contour. Thus, when the weld is made, a globule of molten thermoplastic material is formed. The two joined pieces of yarn are then pulled apart, and this, to a certain extent, stretches the globule to a thickness which closely approximates the thickness of the yarn. However, there are upstanding jagged edges. When the welded yarn is used in a textile operation, such as knitting or weaving, the jagged edges of the weld abrade the adjacent yarn and break the filaments. This can lead to a reject in the finished fabric.

Various devices have been developed for molding the joined or spliced pieces of yarn. For instance, in U.S. Pat. No. 3,184,363 there is disclosed a device for molding two pieces of thermoplastic yarn through the use of high frequency vibrations. Although the molded joint will have a thickness equal to the thickness of the yarn, a problem encountered in using this type of molding device is that there are free ends of the yarn which project from the molded joint. These free ends can create a problem in the appearance of a fabric formed from the yarn.

In U.S. Pat. No. 2,617,914 there is disclosed a device for heating and molding two ends of yarn simultaneously. However, in this device the two yarns which are to be joined must first be cut accurately and held in abutment in the welding device. This is time consuming and cannot be used efficiently in a textile operation thousands of welds must be made in a given day.

U.S. Pat. No. 3,616,064 discloses a device for splicing and molding two lengths of thermoplastic yarn through the use of ultrasonic vibrations. Here again, this device will leave loose ends on opposite sides of the ultrasonic weld.

In U.S. Pat. No. 3,827,929 there is disclosed a device and method for welding two lengths of thermoplastic yarn, and then molding the weld to the configuration of the continuous yarn by rolling the same between the fingers of an operator as the joint cools. Although this method has been found to be effective in reducing the thickness of the weld and in eliminating rough edges of the weld on carpet yarn, which is approximately 0.06 inch (1.52 mm), this method cannot effectively be used on thinner yarns, such as yarns used in making seat belt webbing. The seat belt webbing yarns are only approximately 0.012 inch (0.30mm) in diameter. Thus, it has been found that there is not sufficient mass to the weld joint on the thinner yarns to enable effective rolling of the joint between the fingers to smooth the joint.

It was the recognition of the problem of the weld joints produced by all of the yarn welders now in use that led to the instant invention. When the weld joint is left in its untreated state, there are rough edges, which can produce rejects in the final fabric, either by protrusion of the weld joint or by the destroying of the yarn filaments during the textile operation by abrasion of the weld joints on the filaments. However, prior to the instant invention, there was no effective means of smoothing the weld joint and reducing its diameter, especially on thinner yarns.

The instant invention overcomes all of the aforementioned problems of the prior art yarn welders. The device of this invention will weld two ends of yarns to form a unitary yarn, and will automatically mold the weld joint to have it conform in size and shape to the continuous yarn. All of the rough edges are removed from the weld joint automatically.

It is therefore an object of this invention to provide a novel device for welding thermoplastic yarns.

It is another object of this invention to provide a novel method of welding thermoplastic yarns.

These and other objects of this invention are accomplished by providing a welding device comprising a heating element, means for holding the ends of two lengths of yarn against said heating element, means for energizing said heating element to weld the two ends of said yarns to form a continuous yarn and sever the free ends of said yarns, means for placing the welded yarn under tension and means for molding the weld joint to smooth the same and reduce its size.

Other objects and many of the attendant advantages of this invention will be readily appreciated as the same becomes better understood by reference to the following detailed description when considered in connection with the accompanying drawings wherein:

FIG. 1 is an exploded perspective view of the device of this invention, with the cover removed and with the yarn in place after welding and before molding;

FIG. 6 is a sectional view taken along the line 6—6 of FIG. 3;

FIG. 7 is a sectional view taken along the line 7—7 of FIG. 3;

FIG. 7A is an exploded perspective view of the elements forming a locking and release mechanism for the yarn welder of this invention;

FIG. 8 is a perspective view of the molding blade and support bar therefor;

FIG. 9 is a perspective view of the two yarn ends immediately after welding has taken place;

FIG. 10 is an elevational view showing the molding operation;

FIG. 11 is a perspective view of the final weld after molding; and

FIG. 12 is a schematic diagram showing the circuitry for the device of this invention.

Figure 3:
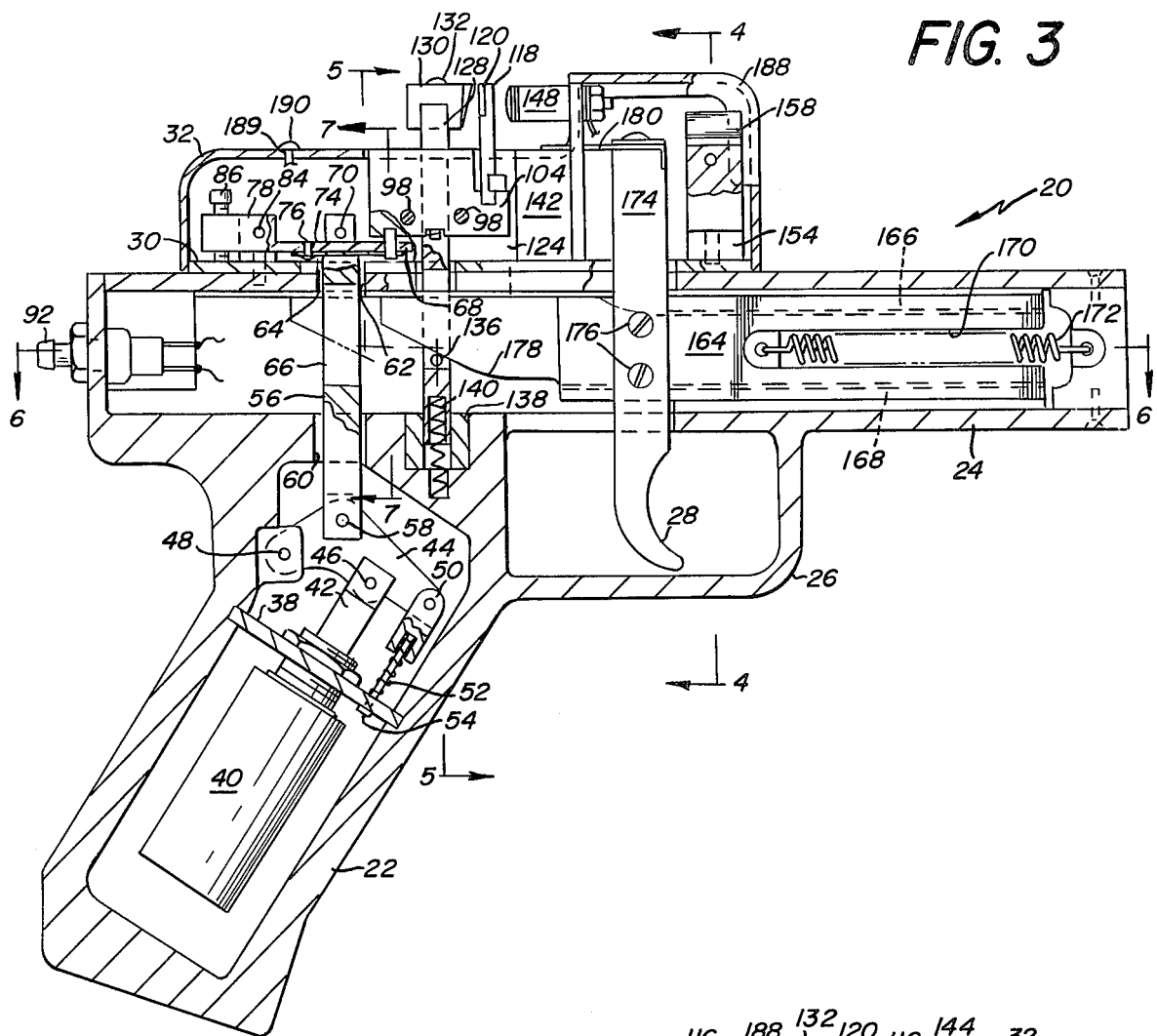
FIG. 3 is a sectional view taken along the line 3—3 of FIG. 2.

Referring now in greater detail to the various figures of the drawings wherein like reference characters refer to like parts, a yarn welding device embodying the present invention is generally shown at 20 in FIG. 1. As seen in FIGS. 1 and 3, device 20 is basically in the shape of a pistol, and includes a hand grip 22, a barrel 24, a trigger housing 26 and a trigger 28. Mounted on barrel 24 is a plate 30, and a removable cover 32 covers the mechanism mounted on the plate 30.

Figure 5:
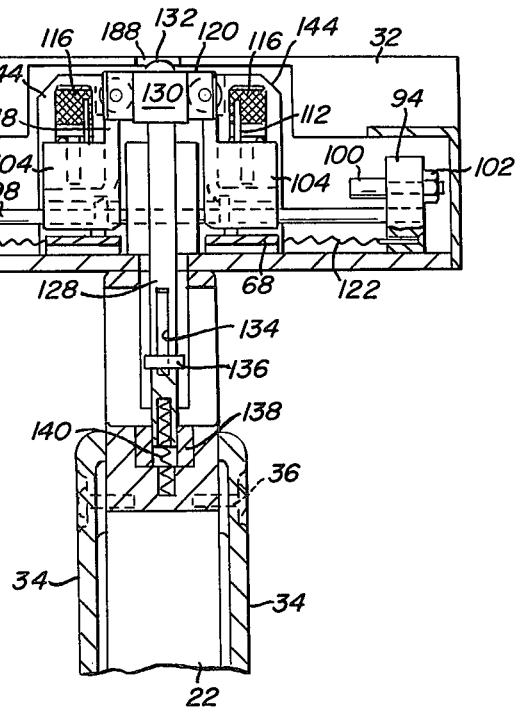
FIG. 5 is a sectional view taken along the line 5—5 of FIG. 3.

As seen in FIGS. 3 and 5, grip 22 is hollow and the interior is covered by removable side plates 34 which are secured in place by screws 36. A plate 38 (FIG. 3) is secured to the walls of hand grip 22, and a solenoid 40 is in turn secured to plate 38. The piston 42 of solenoid 40 is pivotally connected to link 44 by pin 46. Link 44 is in turn pivotally connected to the interior of hand grip 22 by pin 48.

The other end of link 44 has secured thereto a socket 50. A compression spring 52 has one end received in socket 50 and the other end telescoped over a pin 54 which passes through plate 38. Referring to FIGS. 3 and 7, it is seen that link 44 is connected to bar 56 by a pin 58. Bar 56 projects vertically upward through opening 60 in the top of hand grip 22, opening 62 in the top of barrel 24 and opening 64 in the plate 30. Bar 56 includes a vertical slot 66 (FIG. 7). The top of bar 56 passes through a release plate 68 (FIG. 7). A horizontal pin 70 passes through the top of bar 56.

Referring to FIG. 7, it is seen that a pair of spaced pins 72 are secured on release plate 68. The upper surfaces of pins 72 incline downwardly in going from the center toward the side of plate 68. A pair of spaced leaf springs 74 are positioned under plate 68. Springs 74 are held in place by pins 76 (FIG. 3) which pass through openings 77 (FIG. 7A) in springs 74 and are secured in plate 68 (FIG. 3). As seen in FIG. 7A, each spring 74 has a slot 75 formed at the end opposite opening 77. A pair of slots 79 are formed in each pin 72 and the legs around slot 75 are received in slots 79.

The spring 74 resiliently holds the pins 72 in the position shown in FIG. 7, and the legs engaged in slot 79 prevent the pins 72 from rotating.

Plate 68 includes a boss 78 at one end thereof. A pair of L-shaped brackets 80 are secured on the top of plate 30 by bolts 82. Boss 78 and associated plate 68 are pivotally connected to brackets 80 by pin 84. An adjustment srew 86 is threadedly secured in boss 78 behind the pivot point 84.

Figure 2:
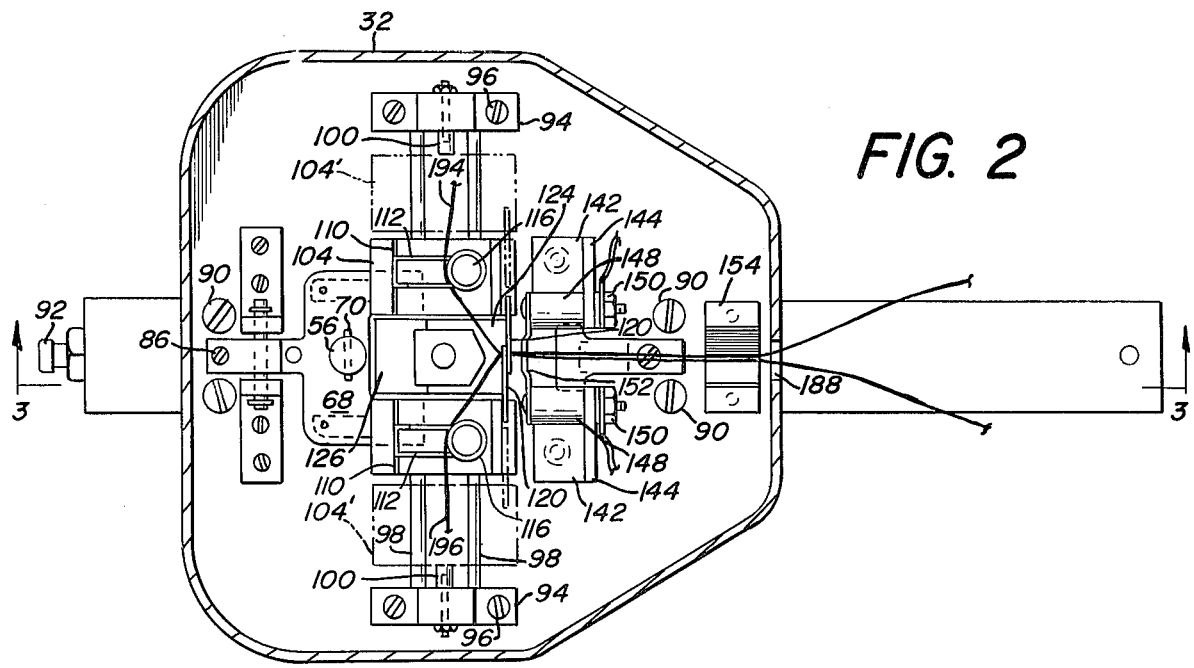
FIG. 2 is a top sectional view through the cover of the device of this invention, and showing the yarn in place prior to welding.

As seen in FIGS. 1 and 2, plate 30 is secured on barrel 24 by screws 90. A starter button 92 and associated switch are mounted in the rear of barrel 24.

As seen in FIGS. 1 and 2, a pair of spaced blocks 94 are secured on plate 30 by screws 96. A pair of spaced rods 98, which are parallel to each other, pass between blocks 94 and have their ends secured therein. A pin 100, having its rear end externally threaded, is secured in each block 94 by an associated nut 102 (FIG. 5). A pair of spaced blocks 104, having lateral bores therein, are slidably mounted on rods 98. The rods pass through the bores in blocks 104.

Referring to FIG. 7, it is seen that each block 104 has a beveled inner edge 106. A bore 108 is formed in the bottom of each block 104. Bore 108 is circular in cross-section, and has a diameter which is slightly larger than the diameter of pin 72.

Referring to FIGS. 1 and 2, it is seen that each block 104 includes an upper slot 110. A clip 112 is secured in each slot 110, and has a portion thereof projecting upwardly from the block 104. Clip 112 is formed from a smooth spring wire, and has an inclined surface 114, which acts as a yarn guide. A rod 116, which has a knurled outer surface to aid in gripping, is secured in each block 104.

A bar 118 is secured to each block 104 and projects vertically upward therefrom. A tab 120, having a V-shaped end, projects inwardly from each bar 118. As seen in FIG. 5, a tension spring 122 connects each stationary block 94 with an adjacent movable block 104, and tends to pull the block 104 outwardly along rods 98.

Referring to FIGS. 1 and 2, it is seen that a pair of stationary blocks 124 and 126 are mounted on plate 30 between movable blocks 104. Rods 98 pass through blocks 124 and 126, as best seen in FIG. 2. As further seen in FIG. 2, plate 68 has a central opening, and the legs of the plate pass on opposite sides of stationary blocks 126. As seen in FIG. 1, blocks 124 and 126 comprise a single structure. The structure is formed in two blocks for ease of machining to form necessary openings therein. In this connection, there is a rectangular opening formed at the rear of block 124 through which rectangular rod 128 (FIGS. 1, 3 and 5) passes. A molding head 130 is secured on rod 128 by screw 132.

As seen in FIGS. 3 and 5, rod 128 projects downwardly through aligned openings in plate 30 and barrel 24.

Figure 4:
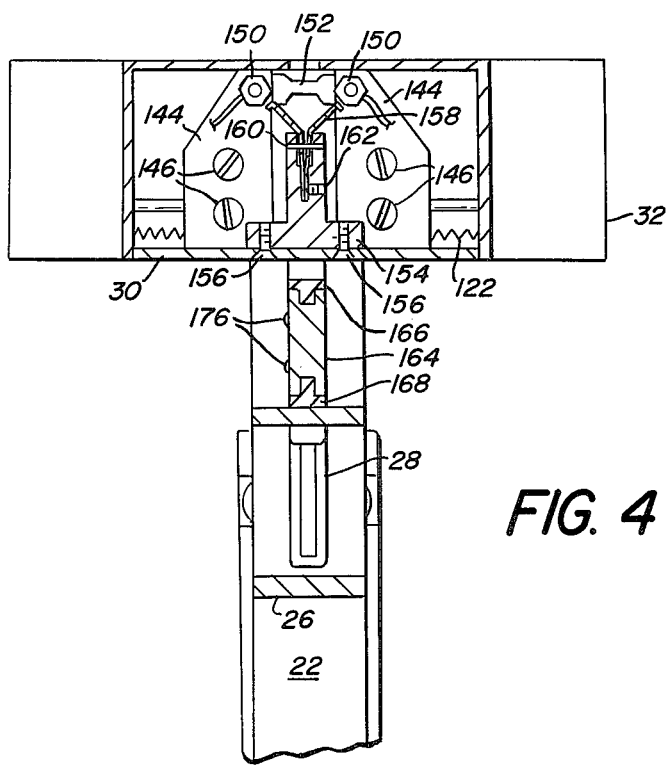
FIG. 4 is a sectional view taken along the line 4—4 of FIG. 3.

As seen in FIG. 5, a vertical slot 134 is formed in rod 128, and a cam roller 136 is secured at the base of the slot. A bushing 138 is mounted in the top of handle 22, and the rod 128 is slidably mounted within bushing 138. A compression spring 140 is received in a bore in the bottom of rod 128 and is also received in a bore in handle 22. Compression spring 140 urges rod 128 upwardly. A pair of blocks 142 are mounted on plate 30 forwardly of blocks 104. An insulating plate 144 is secured to each block 142 by screws 146 (FIG. 4). An insulator 148 is secured on each plate 144 by bolts and associated nuts 150. A heating ribbon 152 is secured on insulators 148 by bolts and nuts 150.

Referring to FIGS. 2 and 4, it is seen that a block 154 is mounted on plate 30 by screws 156. As seen in FIGS. 1 and 4, a leaf spring 158 is secured in an upper slot in block 154. The securement is through the use of a pin 160 (FIG. 4) passing through the block and a set screw 162. The top of leaf spring 158 is flared, in the shape of a V, as best seen in FIGS. 1 and 4.

As seen in FIG. 3, a plate 164 is mounted in barrel 24. As seen in FIG. 4, an upper ribbed bar 166 is secured to the top of barrel 24, and a lower ribbed 168 is secured to the bottom of barrel 24. As further seen in FIG. 4, the ribs of bars 166 and 168 are received in longitudinal slots in plate 164, and the combination of the ribs and slots acts as a track for the rectilinear movement of plate 164. As seen in FIG. 3, plate 164 includes a longitudinal slot 170. A tension spring 172 connects bar 1764 with the front of barrel 24.

Trigger 28 includes an integral, upwardly projecting bar 174 (FIG. 3). Plate 164 is secured to bar 174 by screws 176. As seen in FIG. 3, the rear portion of plate 164 includes a cam surface 178 on its lower side. The cam surface 178 rests on roller 136 of rod 128.

As seen in FIGS. 3 and 8, bar 174 has a blade 180 secured thereon by screw 182. Blade 180 has an enlarged or T-shaped head 184.

Referring to FIG. 1, it is seen that cover 32 is hollow, and conforms in shape to plate 30. A central opening 186 is formed in cover 32 and a slot 188 projects forwardly from opening 186. In use, the cover 32 overlies plate 30 and the elements mounted on the plate. As seen in FIG. 3, the cover is secured in place by a screw 190 which passes through opening 189 (FIG. 1) in the cover and is received in plate 30. Alternatively, the cover can be secured in place by spaced screws. When using this method of securement, in the event of a malfunction during use, as explained hereinafter, the opening 189 is provided to release blocks 104 from pins 72 by inserting a rod and pressing it against bar 56.

In reviewing FIGS. 1 and 3, it will be seen that rods 116 and associated blocks 104 are accessible through opening 186 in the cover. Likewise, heater ribbon 152 is also accessible through this opening. Clip 158 is accessible through slot 188 in the cover. Having these elements accessible enables the user of the device to make all of the manipulative steps necessary to weld the yarn without removing the cover.

The operation of yarn welder 20 will now be described.

To load the device, the leading end 194 of one bobbin of yarn and the trailing end 196 of a second bobbin of yarn are threaded together through the device. The threading is accomplished by placing the yarn into the resilient clip 158 (FIG. 1). The clip will frictionally hold the yarn in place. After the yarns 194 and 196 are placed in the clip, they are pulled across the heater ribbon 152, separated by the molding head 130, and then allowed to hang freely behind plate 30.

The rods 116 (FIG. 1) are then grasped between the thumb and forefinger and squeezed together. In doing this, the beveled edges 106 (FIG. 7) of blocks 104 will ride over the beveled edges of pins 72, and depress the pins against the urging of springs 74. This will engage the pins in bores 108 of blocks 104. In FIG. 7, one block 104 is shown in the engaged position. It should be understood that at the beginning of the welding operation, the other block will also be in the engaged position. Arrows 192 in FIG. 7 indicate that the blocks 104 are movable rectilinearly along rods 98.

After the blocks 104 are moved to their center positions, the ends 194 and 196 of the yarn are threaded and pulled outwardly at clips 112 to hold the yarn taut against heater ribbon 152. The condition of the yarn at this stage of the operation is shown in FIG. 2. The blocks 104 are in the position shown in full line in FIG. 2. It should also be noted in FIG. 2 that the two yarn ends are held together on the heater ribbon 152 by the overlapping of the tabs 120 (FIG. 1). Thus, as seen in FIG. 1, the tabs are in the V-shape, and when they overlap by bypassing each other (FIG. 2), the two yarn ends will be drawn together at the center of the V. Since the tabs 120 are adjacent the heater ribbon 152, the yarn ends will be contiguous at the heater ribbon.

With the device in the condition shown in FIG. 2, starter button 92 is then depressed. This energizes heater ribbon 152, and causes it to become visibly hot, by glowing red. The heat will fuse the two yarns together and form a globule of molten plastic at the heater element 152. In referring to FIG. 9, the globule is shown at 198. Simultaneously with the formation of the globule, the free ends of the yarn 194 and 196 are severed from the remainder of the yarn by the heater element. The severed ends are shown in FIG. 1.

After a predetermined amount of time, such as five seconds, solenoid 40 is actuated. At this point, the globule of molten thermoplastic yarn 198 has been formed and the free ends 194 and 196 will have been severed by the heater ribbon 152. The solenoid 40 is automatically actuated by the circuitry of the device, which will be explained hereinafter. When the solenoid is actuated, piston 42 is drawn into the solenoid, thereby pivoting plate 44 in a clockwise direction around pin 48 (FIG. 3). This causes bar 56 to be moved downwardly, in view of the fact that the bar is connected to plate 44 by pin 58. The downward movement of bar 56 brings pin 70 into contact with the upper surface of plate 68 (FIG. 7). This causes the depression of plate 68 against the urging of spring 52. When the plate 68 is depressed by the pin 70, pins 72 on plate 68 are removed from bores 108 in blocks 104. This causes the blocks 104 to move outwardly to the position shown in phantom at 104' (FIG. 2) under the urging of springs 122 (FIG. 5).

As the blocks 104 move apart, they are eventually stopped by pins 100 in the position shown at 104' in FIG. 2. At this time, the yarns 194 and 196 move from the position shown in FIG. 2 to the position shown in FIG. 1. In this connection the yarns are securely clamped in clips 112, which place a tension on weld globule 198, thereby stretching it. At the same time as the blocks 104 move apart, the solenoid 40 is deenergized and the piston 42 returns to the position shown in FIG. 3. The spring 52 aids in returning the piston to this position. When the piston returns to its at-rest position, the pressure on plate 68 is removed, and the plate is returned to the position shown in FIG. 7 under the urging of spring 52.

When the globule of molten thermoplastic material is stretched, it assumes an elongated form, with outer jagged edges. When in this form, it is exemplary of the welds made on the prior art devices discussed above. The improvement of this invention resides in a means for molding and shaping the still-molten globule. The molding and shaping operation is carried out by squeezing the trigger 28.

In utilizing the device of this invention, it has been found that there should be a time delay between the time the globule 198 is formed and the time that it is molded. This time delay is automatically determined by the circuitry of this invention. Thus, after a predetermined amount of time, the solenoid 40 is energized, which causes the blocks 104 to part, as described above. This places a tension on the yarn and the globule 198. However, the molding operation is not carried out immediately. Instead, before the molding operation is carried out, the operator of the device must wait until the glow of the heater ribbon ceases. Thus, the heater ribbon serves the dual function of forming the weld and acting as a single light to indicate that the molding operation should be carried out. The dwell time in which the heater will continue to be lit is easily adjusted through the circuitry.

By way of example, when using a polyester yarn having a diameter of approximately 0.012 inch (0.03 mm.), a weld time of five seconds can be used to form the globule 198. Thereafter, solenoid 40 is automatically actuated. The weld and yarn are stretched for approximately two seconds, which is the time it takes for the glow of the heating ribbon to cease. Thereafter, molding, as described hereinafter, takes place.

The times involved are easily adjusted to accomodate the particular yarn that is being welded. Simple experimentation can easily determine the time of welding and the time delay before molding. It has been found, however, that if the weld is made immediately after removal of the yarn from the heat and the stretching of the yarn, the weld is too weak, even though it is a smooth weld. Alternatively, if too long a time period exists between the finishing of the welding and the molding of the weld, the molding will not take place. Whatever dwell time is necessary for the particular yarn in question, it will impose no problem on the operator of the device. He will realize that as soon as the glow on the heating ribbon is terminated, he is to squeeze the trigger 28 to effectuate molding.

Insofar as the molding operation is concerned, after the yarn is in the stretched condition shown in FIG. 1, and the heater ribbon 152 has ceased glowing, trigger 28 is pulled, in the normal manner of pulling a trigger on a gun. As seen in FIG. 3, the pulling of the trigger 28 causes the plate 164 to move rearwardly in barrel 24, along tracks 166 and 168. As the plate 164 moves rearwardly, the cam surface 178 will bear against roller 136. This in turn depresses bar 128 and moves it downwardly, against the urging of spring 140. Simultaneously, blade 180 (FIGS. 3 and 8) is moved rearwardly toward bar 128. The plate passes through slot 66 (FIG. 6) of bar 56 during its rearward movement.

Again referring to FIG. 1, as bar 128 is moved downwardly, associated molding head 130 is also moved downwardly, and it will be brought into contact with the soft mass 198 of thermoplastic material. At the same time, the forward head 184 of blade 180 will also be brought to bear against the molten or soft mass 198. As seen in FIG. 10, the molten or soft mass 198 is compressed downwardly between head 130 and block 124, which acts as an anvil. Simultaneously, the mass is compressed laterally between rod 128 and the enlarged head 184 of blade 180.

The molding operation takes place simultaneously upon the squeezing or pulling of trigger 28. The trigger need be held in the pull position for only approximately one second to effectuate complete molding. When the pressure on the trigger is released, plate 164 is returned to the position shown in FIG. 3 by the tension of spring 172. Spring 140 then returns rod 128 to the position shown in FIG. 3, since there is no further pressure on roller 136 by cam surface 178. However, the cam surface does limit the upper movement of rod 128 under the urging of spring 140. At the same time as the plate 164 is retracted, the trigger and its associated bar 174 will be pulled back to the position shown in FIG. 3.

After the molding operation has been completed, the free ends of the yarn 194 and 196 are removed from clip 158 and discarded. The welded yarn is then removed from clips 112 and from under the molding head 130, as viewed in FIG. 1. The completed weld is shown at 200 in FIG. 11. As seen therein, the weld is smooth and of a size which approximates the diameter of the continuous yarn.

The electrical circuitry for the yarn welding device of this invention is shown generally at 250 in FIG. 12. As can be seen therein, the circuitry comprises a transformer 252 having a primary 254 and a secondary 256. One side of the primary 254 is connected to a conductor 258 and to a conductor 260, the latter of which serving as one input to an SCR control circuit 262. The other circuit input to circuit 262 is connected to conductor 263. The SCR control circuit 262 is conventional and is adapted to pass current at its output when gated.

The other side of the primary 254 is connected to a conductor 264 and to one side of a fuse 266. The other side of fuse 266 is connected to one side of a switch 268. The other side of switch 268 is connected to a conductor 270. The conductors 258 and 270 are adapted to be connected to a conventional 110 volt 60 cycle AC source. A potentiometer 272 is connected to the SCR control circuit 262 to enable the adjustment of the firing angle of circuit 262. The primary 274 of a transformer 276 is connected across the output of the SCR control circuit. The transformer 276 includes a secondary 278, one side of which is connected to a conductor 280 and the other side of which is connected to a conductor 282. The heating ribbon 152 is connected between conductors 280 and 282.

The secondary 256 of transformer 252 serves as the input to a DC supply circuit 284 having a positive output terminal 286 and a negative output terminal 288. The positive terminal 286 of the DC supply 284 is connected to a conductor 289. The conductor 289 is connected to one side of resistor 290, a movable contactor 292 of a relay 294 and one side of a resistor 296.

The negative terminal 288 of the DC supply 284 is connected to a conductor 298. The conductor 298 is connected to the negative side of a capacitor 300, a movable contactor 302 of a time delay relay 304 and to one side of a coil 306 of the relay. In addition conductor 298 is connected to a movable contactor 308 of another time delay relay 310, one side of the coil 312 of the relay 310, and to conductor 280. The conductor 320 is connected to the negative side of capacitor 318, one side of the start button 92, to stationary contact 316 of relay 294 and to one side of coil 314. The other side of the start button 92 is connected to the conductor 280.

The other side of resistor 290 is connected to a stationary contact 322 of the relay 304. The relay 304 also includes stationary contacts 324, 326 and 328 and a second movable contactor 330. The movable contactor 330 is connected to the positive side of the capacitor 300. The stationary contact 324 is connected to a conductor 322. The stationary contact 326 is connected to a stationary contact 334 of the relay 310 and to a movable contactor 336 of the relay 294. The stationary contact 328 of relay 304 floats.

The relay coils 306 and 312 are connected together at their corresponding sides by conductor 337 which is in turn connected to a stationary contact 338 of relay 294. The conductor 264 is connected to stationary contact 340 of the relay 310. The relay 310 also includes additional stationary contacts 342 and 344 and an additional movable contactor 346. The movable contactor 346 is connected to a movable contactor 348 of the relay 294. The stationary contacts 342 and 344 of the relay 310 float. The relay 294 also includes additional stationary contacts 350, 352, 354 and 356. The contacts 350, 354 and 356 float while the contact 352 is connected to conductor 263.

The side of the relay coil 314 not connected to contact 316 is connected to the cathode of a diode 358. The anode of the diode 358 is connected to the positive side of the capacitor 318 and to the cathode of a diode 360. The anode of the diode 360 is connected to the other side of the resistor 296. A conductor 362 shunts the series connection of the resistor 296, the diode 360 and the diode 358.

The conductor 332 is connected to one side of the trip solenoid 40, the other side of which being connected to the conductor 280.

Operation of the circuitry 250 is as follows:

Upon the depression of start button 92 the coil 314 of relay 294 is energized. The DC supply is always energized via the normally closed switch and the primary 254 of transformer 252. The DC supply provides power through conductors 289 and 298 to the coil 314 of the relay 294. At the same time that the relay coil 314 is energized by the DC supply 284, the capacitor 300 becomes charged through the path including the positive output terminal 286, the resistor 290, contacts 322 and 330 of relay 304 and the negative output terminal 288.

The energization of the relay coil 314 effects the movement of the movable contactors 348, 292 and 336 of the relay to the opposite position as that shown in FIG. 12 whereupon the contactor 348 is connected to the contact 352, the contact 292 is connected to the contact 338 and the contact 336 is connected to the contact 316. This action results in the provision of alternating current to the SCR control via the path including the conductor 258, the conductor 260, the SCR control 262, the conductor 263, the contacts 352 and 348 of the relay 294, the contacts 346 and 340 of the relay 310, the conductor 264, the fuse 266, the closed switch 268 and the conductor 270.

As will be appreciated by those skilled in the art, upon the gating or triggering of SCR control current flows through the primary 274 of transformer 276. This action results in the passage of current through the circuit including the secondary 278, the conductor 280, the heating ribbon 152 and the conductor 282, thereby causing the heating ribbon to get hot.

At the same time that the heating ribbon 152 is heated by the passage of current therethrough, the DC supply 284 effects the energization of the coil 312 of relay 310 through the path including the positive output terminal 286, the conductor 289, the contacts 292 and 338 of the relay 294, conductor 337, the coil 312, the conductor 298 and negative DC terminal 288.

After a predetermined time, e.g., seven seconds, the coil 312 is energized whereupon the relay contacts 346 and 308 of time delay relay 310 move to the opposite position from that shown in FIG. 12 and into the position wherein the contactor 346 is connected to the contact 342 and the contactor 308 is connected to the contact 344. The movement of movable contactor 346 away from the contact 340 results in the interruption of current to the SCR control circuit 262, whereupon current ceases flowing through the heating ribbon 152 and said ribbon begins to cool.

At the same time that relay coil 312 of relay 310 is energized, the coil 306 of the relay 304 is also energized. This action occurs through the following path: The positive DC terminal 286 of the DC supply 284, the conductor 289, the contacts 292 and 338 of relay 294, the conductor 337, the relay coil 306, the conductor 298 and negative DC terminal 288.

After a predetermined time, e.g., five seconds, the coil 306 is energized whereupon the contactors 302 and 330 of relay 304 move to the opposite position as that shown in FIG. 12. To that end, the contactor 330 is connected to contact 324 and the contactor 302 is connected to contact 328. This action results in the discharge of the capacitor 300 through the trip solenoid coil 40, via the following path: The capacitor 300, the contactor 330, the contact 324, the conductor 332, coil of the trip solenoid 40, conductor 280 and the conductor 298.

The discharge of energy from the capacitor 300 through the trip solenoid coil actuates the solenoid, which actuation, as described heretofore, depresses plate 68 which permits the blocks 104 to separate, thereby pulling the yarn under tension.

The circuitry described herein is exemplary of circuitry that can be used in carrying out this invention. As should be obvious to one skilled in the art, other circuits can be used for carrying out the functions of the yarn welding device of this invention.

Device 20 is extremely light in weight, and weighs approximately two and one-half pounds (1.14 kg.) when the handle, barrel and cover are constructed from aluminum. If these elements were constructed from plastic, the device would be lighter. One of the reasons for the lightness of the device of this invention is that substantially all of the circuitry of FIG. 12 is contained in a separate power pack. The only electrical elements in device 20 are the starter button 92, the heating ribbon 152 and the solenoid 40, and their associated conductors. All other elements of the circuitry are in the power pack which is connected to the device 20 through appropriate conductors. Because of its lightness and shape, the device is easily handheld and can be used for making a substantial number of welds without fatiguing the user of the device.

The device of this invention can be used in welding the leading end of one bobbin of yarn and the trailing end of a second bobbin of yarn whenever continuous textile operations are being carried out. It can also be used to weld two yarn ends whenever there is a break in the yarn. No preparation of the yarn is necessary to obtain a weld, since the loose ends are readily discarded after the weld is made, as is apparent from FIG. 1.

The device of this invention can be used for welding any of the thermoplastic yarns known to the art. By way of example, it can be used to weld nylon or polyester yarns. The device is particularly useful in welding yarns of a relatively small diameter, such as those yarns used in making webs for automobile seat belts. Because of the thinness of these yarns, the weld cannot easily be molded by rolling the same between the thumb and forefinger, as can be done with the relatively thick carpet yarns, which are approximately five times as thick as the yarns used in making seat belts. Additionally, the weld is carried out automatically with the device of this invention, as opposed to the requirement for hand manipulation utilizing the prior art devices.

Without further elaboration, the foregoing will so fully illustrate my invention, that others may, by applying current or future knowledge, readily adapt the same for use under various conditions of service.

What is claimed as the invention is:

1. A yarn welding device comprising a heating element, means for holding the ends of two lengths of yarn against said heating element, means for energizing said heating element to weld the two ends of said yarn to form a continuous yarn and sever the free ends of said yarn, means for placing the welded yarn under tension and means for molding the weld joint to smooth the same and reduce its size, said molding means comprising a vertically movable molding head that is brought vertically downward against said weld joint and a laterally movable molding blade which is brought to bear against said weld joint, said head and blade cooperating to mold said joint.

2. The yarn welding device of claim 1 and further including a slideable bar in said device, said slidable bar causing the downward movement of said molding head and the lateral movement of said molding blade.

3. The yarn welding device of claim 2 wherein said slidable bar has a cam surface thereon, with said cam surface bearing against a cam follower associated with said molding head, thereby depressing said molding head.

4. A yarn welding device comprising a heating element, means for holding the ends of two lengths of yarn against said heating element, a pair of movable carriages, with each of said lengths of yarn being releasably secured on one of said movable carriages, means for energizing said heating element to weld the two ends of each yarn to form a continuous yarn and sever the free ends of said yarn, means for placing the welded yarn under tension, each movable carriage being adapted to be placed in one of two positions, with one of said positions holding said yarn in proximity to said heating element and the other of said positions being removed from said heating element and placing said welded yarn under said tension, and means for molding the weld to smooth the same and reduce its size.

5. The yarn welding device of claim 4 wherein said carriages are releasably held in said one of said positions.

6. The yarn welding device of claim 5 and further including means for releasing said carriages from said one of said positions after a predetermined amount of time, and further including means for moving said carriages to said other of said positions when they are released.

7. The yarn welding device of claim 5 wherein said moving means comprises a spring secured to each of said carriages.

8. The yarn welding device of claim 4 wherein said carriages are slidably mounted on at least one rail, whereby said carriages are movable laterally along said rail.

9. The yarn welding device of claim 8 and further including stop means associated with said rail, said carriages being urged against said stop means by spring means.

10. A yarn welding device in the shape of a pistol, said yarn welding device comprising a hand grip, a barrel and a trigger, a supporting plate on said barrel, said supporting plate having a pair of slidable carriages mounted thereon, each of said carriages being adapted to releasably hold a free end of a yarn, heating means on said plate, yarn retaining means on said plate, whereby said yarn ends can be releasably secured on said carriages, pass across said heating means and be secured in said retaining means, means for actuating said heating means to weld said ends together, means for molding the welded joint, and said carriages being movable from a first position adjacent said heating means to a second position wherein said weld joint is placed under tension, prior to molding.

* * * * *